US008216674B2

(12) United States Patent
Simpson et al.

(10) Patent No.: US 8,216,674 B2
(45) Date of Patent: Jul. 10, 2012

(54) SUPERHYDROPHOBIC DIATOMACEOUS EARTH

(75) Inventors: John T. Simpson, Clinton, TN (US);
Brian R. D'Urso, Clinton, TN (US)

(73) Assignee: Ut-Battelle, LLC, Oak Ridge, TN (US)

( * ) Notice: Subject to any disclaimer, the term of this patent is extended or adjusted under 35 U.S.C. 154(b) by 1331 days.

(21) Appl. No.: 11/777,486

(22) Filed: Jul. 13, 2007

(65) Prior Publication Data

US 2010/0021745 A1    Jan. 28, 2010

(51) Int. Cl.
*A61F 13/00* (2006.01)
*B05D 5/00* (2006.01)

(52) U.S. Cl. ........................ 428/403; 428/323

(58) Field of Classification Search ........... 428/402–404
See application file for complete search history.

(56) References Cited

U.S. PATENT DOCUMENTS

| | | | |
|---|---|---|---|
| 3,931,428 A * | 1/1976 | Reick ........................... | 428/149 |
| 5,458,976 A | 10/1995 | Horino et al. | |
| 5,733,365 A | 3/1998 | Halko et al. | |
| 6,360,068 B1 | 3/2002 | Kinoshita et al. | |
| 6,410,630 B1 | 6/2002 | Hoover et al. | |
| 6,528,220 B2 | 3/2003 | Yoshida et al. | |
| 6,743,842 B1 | 6/2004 | Fukagawa et al. | |
| 6,800,412 B2 | 10/2004 | Sugiyama et al. | |
| 6,887,636 B2 | 5/2005 | Matsuda et al. | |
| 6,936,390 B2 | 8/2005 | Nanya et al. | |
| 7,098,145 B2 | 8/2006 | Fukushima et al. | |
| 7,110,710 B2 | 9/2006 | Yamashita et al. | |
| 7,129,013 B2 | 10/2006 | Higuchi et al. | |
| 2002/0164419 A1 | 11/2002 | Fukushima et al. | |
| 2003/0013795 A1 * | 1/2003 | Nun et al. ..................... | 524/442 |
| 2004/0037961 A1 * | 2/2004 | Dieleman et al. .......... | 427/372.2 |
| 2004/0067247 A1 | 4/2004 | De Sloovere et al. | |
| 2005/0009953 A1 | 1/2005 | Shea | |
| 2006/0008678 A1 | 1/2006 | Fukushima et al. | |
| 2006/0019042 A1 | 1/2006 | Nojima et al. | |
| 2006/0024508 A1 | 2/2006 | D'Urso et al. | |
| 2006/0113618 A1 | 6/2006 | Reboa | |
| 2006/0246277 A1 | 11/2006 | Axtell, III | |

FOREIGN PATENT DOCUMENTS

| | | |
|---|---|---|
| DE | 19950106 | 4/2001 |
| EP | 0171168 | 2/1986 |
| EP | 0927748 | 7/1999 |
| FR | 2852966 A1 * | 10/2004 |
| GB | 1154835 | 6/1969 |

(Continued)

OTHER PUBLICATIONS

Coulson et al., Ultralow Surface Energy Plasma Polymer Films, Chem. Mater., vol. 12, pp. 2031-2038 (2000).* Machine translation of FR2852966A1.*

(Continued)

*Primary Examiner* — Hoa (Holly) Le
*Assistant Examiner* — Alexandre Ferre
(74) *Attorney, Agent, or Firm* — Novak Druce + Quigg LLP

(57) ABSTRACT

A superhydrophobic powder is prepared by coating diatomaceous earth (DE) with a hydrophobic coating on the particle surface such that the coating conforms to the topography of the DE particles. The hydrophobic coating can be a self assembly monolayer of a perfluorinated silane coupling agent. The DE is preferably natural-grade DE where organic impurities have been removed. The superhydrophobic powder can be applied as a suspension in a binder solution to a substrate to produce a superhydrophobic surface on the substrate.

35 Claims, 2 Drawing Sheets

FOREIGN PATENT DOCUMENTS

WO     WO 2004111648 A2 * 12/2004

OTHER PUBLICATIONS

Dolley, Diatomite, US Geological Survey Minerals Yearbook—1999, pp. 24.1-24.6.

Yuan et al., The hydroxyl species and acid sites on diatomite surface: a combined IR and Raman study, Applied Surface Science, 227, pp. 30-39, 2004.

Faulde et al., Toxic and behavioural effects of different modified diatomaceous earths on teh German cockroach, J. Stored Prod. Res., vol. 42, No. 3, pp. 253-263 (Jan. 1, 2006).

Bankovic et al., Obtention of selective membranes for water and hydrophobic liquids by plasma enhanced chemical vapor deposition on porous substrates, Mat. Sci. & Eng. B, vol. 112, No. 2-3, pp. 165-170 (Sep. 25, 2004).

* cited by examiner

SUPERHYDROPHOBIC DIATOMACEOUS EARTH

STATEMENT REGARDING FEDERALLY SPONSORED RESEARCH OR DEVELOPMENT

The United States Government has rights in this invention pursuant to Contract No. DE-AC05-00OR22725 between the United States Department of Energy and UT-Battelle, LLC.

CROSS-REFERENCE TO RELATED APPLICATIONS

Not applicable.

FIELD OF THE INVENTION

The present invention relates to nanostructured hydrophobic or super-hydrophobic powders and articles therefrom.

BACKGROUND OF THE INVENTION

Hydrophobic surfaces bind very weakly with water, which makes drops of water form beads on the surface. A hydrophobic surface is generally defined and is defined herein as that which has a contact angle greater than 90° with a drop of water. Hydrophobic materials that form hydrophobic surfaces include many well-known, commercially available polymers.

A super-hydrophobic surface is generally defined and defined herein as that which has a contact angle greater than 150° with a drop of water at normal ambient temperatures (about 25° C.). The lotus leaf surface, for example, is known to be naturally super-hydrophobic due to the texture of its waxy surface.

There are four known methods for making superhydrophobic materials. One method relates to forming flat surface arrays of vertically aligned PTFE coated carbon nanotubes. A second method is based on forming periodic arrays of pillars on a flat surface using microelectronics based photolithography. A third method involves self aligned polymer nanospheres. The fourth method relates to using porous or roughened fluorinated polymers as a superhydrophobic coating material. Such roughened polymers show increased hydrophobicity and are therefore sometimes referred to as being superhydrophobic. By the standard definition of superhydrophobic that requires a contact angle of >150 degrees with a drop of water, such polymers are either not superhydrophobic, or at best are just barely superhydrophobic.

In principle, any material can yield a superhydrophobic surface because the contact angle that is measured in an air atmosphere results from the water bead having exposure to a supporting surface that is partially air. In practice, the material is hydrophobic. Air displays a contact angle with a water bead of 180°. The other portion is a solid, which when a smooth continuous surface provides a lesser inherent contact angle with water, that can occupy various proportion of the surface depending on its inherent contact angle. This relationship between the contact angle on the partitioned superhydrophobic surface and the portion of the surface that is solid is given by Cassie's law for a single uniform solid material:

$$\cos \theta_c = \gamma(\cos \theta + 1) - 1$$

where $\theta_c$ is the contact angle with water observed for the super hydrophobic surface, $\gamma$ is the fraction of the surface under the water bead that is solid, and $\theta$ is the contact angle displayed with water for a smooth continuous solid surface.

Articles with superhydrophobic surfaces resist moisture to the extent that soiling of the surface is difficult. This resistance results from water being efficiently shed from the surface, carrying with it readily dissolved and wetted particulates. Another application for such a superhydrophobic surface is for dramatically lowering the resistance to water flow at that surface. As the affinity of the surface for air or other gas is much higher than for water, the resistance can be primarily defined by the viscosity of the water with air or other gas rather than the solid surface.

Superhydrophobic powders have the potential to improve a variety of existing technologies profoundly and allow the development of novel technologies. Superhydrophobic powders could be used in a wide variety of structures and applications. Identification of appropriate powder substrates with appropriate surface features, and methods of rendering the surface of those features sufficiently hydrophobic, are needed to yield powders with contact angles in excess of 150°.

SUMMARY OF THE INVENTION

A superhydrophobic diatomaceous earth-derived powder can be prepared where porous diatomaceous earth (DE) particles have a surface that is a continuous hydrophobic layer which conforms to and is bound to the surface of the DE particles. The DE particles preferably have the surface structure of uncalcined DE. The hydrophobic layer is preferably a self assembled monolayer (SAM) such that the topography of the DE particle is retained. Preferred hydrophobic layers include perfluorohydrocarbon moieties, and a preferred perfluorohydrocarbon moiety includes a tridecafluorohexyl unit. Alternately the hydrophobic layer can include hexafluoropropene oxide oligomer moieties.

A method of preparing a superhydrophobic powder involves the steps of providing a DE powder, contacting the DE powder with a SAM precursor containing liquid to form a continuous hydrophobic layer that conforms to and bonds to the DE surface, and removing any excess of the SAM precursor. The DE powder is preferably uncalcined DE. The DE is preferably heat treated at 400 to 700° C. to remove organic contaminates that can fill the features of the DE and interfere with forming and bonding the coating to the DE surface. More preferably the heat treatment is carried out at 500 to 600° C. The contacting of the SAM precursor with the DE can be carried out at any temperature but is preferably carried out at 0 to 100° C.

The hydrophobic SAM precursor can be a molecule of the structure: $X_y(CH_3)_{(3-y)}SiLR$
where y is 1 to 3; X is Cl, Br, I, H, HO, R'HN, R'$_2$N, imidizolo, R'C(O)N(H), R'C(O)N(R"), R'O, F$_3$CC(O)N(H), F$_3$CC(O)N(CH$_3$), or F$_3$S(O)$_2$O, where R' is a straight or branched chain hydrocarbon of 1 to 4 carbons and R" is methyl or ethyl; L, a linking group, is CH$_2$CH$_2$, CH$_2$CH$_2$CH$_2$, CH$_2$CH$_2$O, CH$_2$CH$_2$CH$_2$O, CH$_2$CH$_2$C(O), CH$_2$CH$_2$CH$_2$C(O), CH$_2$CH$_2$OCH$_2$, CH$_2$CH$_2$CH$_2$OCH$_2$; and R is (CF$_2$)$_n$CF$_3$ or (CF(CF$_3$)OCF$_2$)$_n$CF$_2$CF$_3$, where n is 0 to 24. A preferred structure has y=3, X+Cl, L=CH$_2$CH$_2$, and R=(CF$_2$)$_n$CF$_3$. More preferably y=3, X=Cl, L=CH$_2$CH$_2$, and R=(CF$_2$)$_5$CF$_3$. Contacting the DE with the SAM precursor containing liquid can be carried out with the SAM precursor in solution and a catalyst can be included to promote the bonding to the surface and forming the continuous hydrophobic layer. Water can be added to form the hydrophobic layer and the addition can be exposure to air or any atmosphere having some water vapor content. The SAM precursor containing liquid can include a neutralizing agent such as a non-nucleophilic proton acceptor.

A superhydrophic surface can be prepared where a substrate with a surface that is to be superhydrophobic has porous diatomaceous earth (DE) particles on that surface where the DE particles have a continuous bound hydrophobic layer conforming to the DE particle's surfaces and a binder to adhere the DE particles to the substrate surface. The superhydrophobic surface can be those of wood, plastic, glass, ceramic or metal substrates that have DE particles with a self assembled monolayer (SAM) with perfluorohydrocarbon moieties which are hydrophobic units. The perfluorohydrocarbon moieties can be tridecafluorohexyl groups. Alternate SAM layers can have hexafluoropropene oxide oligomer moieties. The binder can be a polymer that locks the superhydrophobic DE particles to the substrate surface.

A method for forming superhydrophobic surfaces has the steps of providing a substrate with the surface to be rendered superhydrophobic, providing porous diatomaceous earth (DE) particles with a continuous and bound hydrophobic layer conforming to the DE particle surface, forming a suspension of the DE particles in a binder solution and contacting the substrate surface with the suspension. The suspension of superhydrophobic DE particles can be contacted with the substrate surface by dipping, painting, or spraying. The binder solution can be a polymer dissolved in a volatile solvent. A preferred binder solution is polystyrene or a polyacrylate dissolved in acetone.

BRIEF DESCRIPTION OF THE DRAWINGS

A fuller understanding of the present invention and the features and benefits thereof will be accomplished upon review of the following detailed description together with the accompanying drawings, in which.

DETAILED DESCRIPTION OF THE INVENTION

Figure 1:
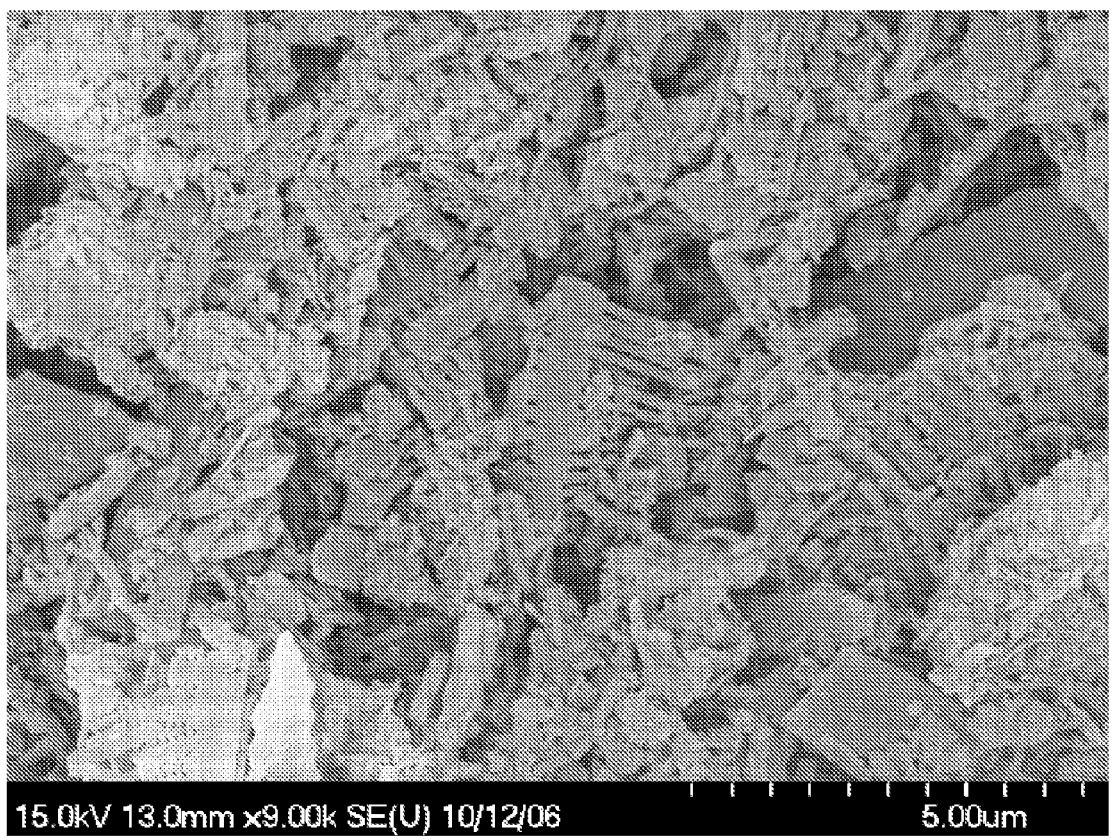
FIG. 1 shows a scanned image of a Scanning Electron microscopy (SEM) image of DE as used in the invention which displays a collection of randomly shaped and sized particles of less than 3 μm in cross-section where the average particle is less than 1 μm in cross-section and the surfaces of the particles display a partitioning of the surface.

The present invention is drawn to coated superhydrophobic diatomaceous earth-derived powders and a process to form the same. The coated powders comprise a plurality of porous diatomaceous earth (DE) particles where the processed porous particles have little or no organic contamination and where the particles retain the surface topography and silicate surface functionalities of natural DE. The surface topography of natural DE is highly partitioned with ridges and peaks extending outwardly from the particle. The silicate surface is that of amorphous silica where numerous silanol, Si—OH groups are surface terminal groups of the silicate network. When the organic contaminate level of the DE is very low, as with some food grade DE, a heat treatment does not have to be carried out to remove organic contaminants. A heat treatment is preferably carried out to assure that organic impurities are substantially removed. The heat treatment is carried out in a controlled temperature range, below 650° C., so that excessive heat does not damage the surface topography or significantly decrease the amount of silanol functionality at the surface, but organic impurities have been thermally decomposed and lost as volatiles. The heat treatment also removes water from the surface of the DE. A hydrophobic coating is disposed on surfaces of the particles. A preferred form of coating is a hydrophobic self-assembled monolayer (SAM).

Diatomaceous earth is a chalk-like, soft, friable, earthy, very fine-grained, siliceous sedimentary rock usually light in color, although white when pure. It is very finely porous and is very low in density, such that it floats on water until its surface is wetted, and is chemically inert to most liquids and gases. It also displays low thermal conductivity and a high fusion point. Many sediments and sedimentary rocks are somewhat diatomaceous. The deposits result from an accumulation in oceans or fresh waters of the amorphous silica (opal, $SiO_2.nH_2O$) cell walls of dead diatoms that are microscopic single-cell aquatic plants (algae). The fossilized skeletal remains—a pair of symmetrical shells (frustules)—vary in size from less than 1 micron to more than 1 millimeter but are typically 10 to 200 microns across. The frustules have a broad variety of delicate, lacy, perforated shapes from discs and balls to ladders, feathers, and needles, which provide the partitioned surface of the DE that provides the surface topography conducive to the achievement of superhydrophobic properties of the present invention when the surface is properly treated in a manner that retains the surface topography but renders the surface hydrophobic. The typical chemical composition of diatomaceous earth is about 86% silica, 5% sodium, 3% magnesium and 2% iron.

DE is generally processed into two different products: natural-grade (or uncalcined) and calcined. The processing of natural-grade diatomite consists of crushing and drying. Crude diatomite commonly contains up to 40 percent moisture and can include more that 60 percent water. Typically a primary crushing is carried out to the material as mined to yield a desired aggregate size. The crushed DE is subsequently milled and dried simultaneously where suspended particles of diatomite are carried in a stream of hot gases. Flash and rotary dryers are used to dry the material to a powder of approximately 15 percent moisture. Typical flash dryer operating temperatures range from 70 to 430° C. The suspended particles exiting the dryer pass through a series of fans, cyclones, and separators. These sequential operations separate the powder into various sizes, remove waste impurities, and expel the absorbed water. These natural-milled diatomite products are then bagged or handled in bulk without additional processing. Natural-grade DE is preferred for the practice of the invention.

For filtration uses, natural grade diatomite is calcined by heat treatment in gas- or fuel oil-fired rotary calciners, with or without a fluxing agent. Straight calcining is used for adjusting the particle size distribution for use as a medium flow rate filter aid. The product of straight calcining has a pink color from the oxidation of iron in the raw material, which is more intense with increasing iron oxide content of the DE. Typical calciner operating temperatures range from 650 to 1,200° C. For straight-calcined grades, the powder is heated in large rotary calciners to the point of incipient fusion, and thus, in the strict technical sense, the process is one of sintering rather than calcining.

DE treated in excess of 650° C. undergoes material and structural changes which is deleterious to the silicate surface functionality to which the hydrophobic coating of the present invention is ultimately bound and at slightly higher temperatures is deleterious to the highly partitioned surface topography that enables superhydrophobic character when coated with a hydrophobic material. The surface of uncalcined DE is that of amorphous silica, more similar in composition to that of precipitated silica rather than pyrogenic silica. There is a reasonably high silanol content to the DE surface that can be characterized as having strong hydrogen bonded silanols, moderate strength hydrogen bonded silanols and weak hydrogen bonded silanols. Upon warming nearly all strongly hydrogen bonded silanols are lost when 650° C. is reached, moderate strength hydrogen bonded silanols are lost when 1,000° C. is achieved and above 1,000° C. the weak hydrogen bonded silanols are lost. For the practice of the invention it is desirable that although surface bound water is reduced to a low level or completely removed, the presence of at least some moderate strength hydrogen bonded silanols is intended to provide sufficient sites for bonding of the coating layer and thereby stabilizing the hydrophobic self-assembly monolayer coating. For this reason calcined DE is generally avoided for the practice of the invention as most calcined DE has been treated in excess of 800° C. The desired surface topography formed by the diatoms and a sufficient amount of silanol functionality on the silicate surface to achieve the continuous SAM of the present invention is generally unavailable with DE that is heat treated in excess of 800° C.

For the practice of the invention the uncalcined DE is treated by heating to temperatures of about 450 to about 700° C., preferably 500 to 600° C., under a dry gas stream or under vacuum prior to applying the hydrophobic coating to the surface. FIG. 1 shows a SEM image of a collection of DE particles as used in the invention. As can be seen in FIG. 1 where the distance between marks on the scale is 500 nm, the crushed DE displays particles where the cross-section is less than 3 µm and the average cross-section is less than 1 µm. These nanoparticles have irregular features with a partitioning of the surface to features of about 100 nm in width and less. The temperature and time of heating depends on the DE as received and the structure of the hydrophobing reagent and the hydrophobing protocol employed. The heat treatment removes organic impurities that can interfere with the deposition of a hydrophobic layer. The heat treatment also removes water from the surface to an extent that the partitioned features of the DE topography are not significantly filled with water. Presence of the water in the voids between the DE features can prevent hydrophobic coatings from conforming to the silicate surface topography displayed by the natural-grade DE which provides the partitioned features of that topography that permits the development of a superhydrophobic surface upon coating with a hydrophobic material. Small amounts of water can be present for practice of the invention as long as the water does not interfere with the hydrophobic coating material conforming to the DE surface.

The hydrophobic material is continuous, such that the portion of the solid surface that will encounter a water bead is covered with the hydrophobic material. Surfaces sufficiently remote from where the water will contact the hydrophobed DE need not be covered with the hydrophobic coating, however, that uncoated surface should not physically or chemically bind to water and promote displacement of the air in the voids with water. Generally, the hydrophobic coating will continuously coat the DE surface, and the coating is preferably formed as a self assembled monolayer. Self assembled monolayers (SAMs) are surfaces consisting of a single layer of molecules on a substrate where the molecule can readily arrange in a manner where a head group is directed or adhered to a surface, generally by the formation of at least one covalent bond, and a tail group is directed to the air interface to provide desired surface properties, such as hydrophobicity in the present invention. As the hydrophobic tail group has the lower surface energy it dominates the air surface providing a continuous surface of the tail groups. SAM methods are advantageous over alternate surface treatment techniques that can be used in the practice of the invention, such as chemical vapor deposition or molecular beam epitaxy, where more exotic conditions and equipment is required to add hydrophobic coatings to the DE surfaces of the invention. SAMs of the present invention can be prepared by adding a melt or solution of the desired SAM precursor onto the substrate surface where at least a sufficient concentration of SAM precursor is present to achieve a continuous conformal monolayer. After the hydrophobic SAM is formed and fixed to the DE surface, any excess precursor can be removed as a volatile or by washing. In this manner the SAM air interface can be primarily or exclusively dominated by the hydrophobic moiety.

One example of a SAM precursor which can be used in an embodiment of the invention is tridecafluoro-1,1,2,2-tetrahydroctyltriclorosilane. This molecule undergoes condensation with the silanol groups of the DE surface releasing HCl to bond the tridecafluoro-1,1,2,2-tetrahydroctylsilyls group via Si—O covalent bonds to the surface of the heat treated DE. The tridecafluorohexyl moiety of the tridecafluoro-1,1,2,2-tetrahydroctylsilyl groups attached to the DE surface provide a monomolecular layer that has a hydrophobicity similar to polytetrafluoroethylene. Hence, by the use of such SAMs, the DE retains the desired partitioned surface structure while rendering that partitioned surface hydrophobic by directing the perfluorohexyl moiety to the air interface thereby yielding the desired superhydrophobic powder.

A non-exclusive list of exemplary SAM precursors that can be used for various embodiments of the invention is:

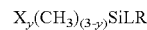

where y=1 to 3; X is Cl, Br, I, H, HO, R'HN, R'$_2$N, imidizolo, R'C(O)N(H), R'C(O)N(R"), R'O, F$_3$CC(O)N(H), F$_3$CC(O)N(CH$_3$), or F$_3$S(O)$_2$O, where R' is a straight or branched chain hydrocarbon of 1 to 4 carbons and R" is methyl or ethyl; L, a linking group, is CH$_2$CH$_2$, CH$_2$CH$_2$CH$_2$, CH$_2$CH$_2$O, CH$_2$CH$_2$CH$_2$O, CH$_2$CH$_2$C(O), CH$_2$CH$_2$CH$_2$C(O), CH$_2$CH$_2$OCH$_2$, CH$_2$CH$_2$CH$_2$OCH$_2$; and R is (CF$_2$)$_n$CF$_3$ or (CF(CF$_3$)OCF$_2$)$_n$CF$_2$CF$_3$, where n is 0 to 24. Preferred SAM precursors have y=3 and are commonly referred to as silane coupling agents. These SAM precursors can attach to multiple OH groups on the DE surface and can link together with the consumption of water, either residual on the surface, formed by condensation with the surface, or added before, during or after the deposition of the SAM precursor. All SAM precursors yield a most thermodynamically stable structure where the hydrophobic moiety of the molecule is extended from the surface and establishes normal conformational populations which permit the hydrophobic moiety of the SAM to dominate the air interface. In general, the hydrophobicity of the SAM surface increases with the value of n for the hydrophobic moiety, although in most cases sufficiently high hydrophobic properties are achieved when n is about 4 or greater where the SAM air interface is dominated by the hydrophobic moiety. The precursor can be a single molecule or a mixture of molecules with different values of n for the perfluorinated moiety. When the precursor is a mixture of molecules it is preferable that the molecular weight distribution is narrow, typically a Poisson distribution or a more narrow distribution.

The SAM precursor can have a non-fluorinated hydrophobic moiety as long as it provides a sufficiently low surface energy and readily conformed to the highly partitioned surface of the uncalcined DE. Although the fluorinated SAM precursors indicated above are preferred, in some embodiments of the invention silicones and hydrocarbon equivalents for the R groups of the fluorinated SAM precursors above can be used.

The surface functionalization of the DE can be carried out with the neat SAM precursor, or the precursor in a non-reactive solvent such as a hydrocarbon, an ether, or a fluorinated solvent. In some cases, the DE can have the SAM precursor deposited on the DE surface from the vapor phase. The surface functionalization can be carried out with an added non-nucleophilic proton acceptor such as a tertiary amine, for example triethylamine or pyridine, to scavenge acidic byproducts of the reaction. A catalyst can be included to accelerate the formation of the SAM. Water can also be included in the formulation if needed as determined via experimentation by one of ordinary skill in the art. The need for added water will depend upon the amount of residual water on the pretreated DE and the nature of the SAM precursor used. When water is needed it can be introduced as a liquid or a vapor. In many cases, water vapor from ambient air is sufficient to react with the SAM precursor to interconnect the precursors into the structured stable SAM coating. The time and temperature needed for effective formation of the SAM coating will depend upon the structure of the SAM precursor and any solvent, scavenger, or catalyst used. With many of the SAM precursors the treatment can be carried out rapidly at normal room temperatures. Temperatures of about 0 to about 100° C. or more can be used for the practice of the invention. Reaction times can vary from as little as about 2 minutes to about 24 hours depending on the SAM precursor and conditions used for the SAM formation. In general, any excess SAM precursor and by-products formed during deposition and bonding can be readily removed from the surface by washing or in some cases by applying a vacuum and/or heat.

The bonding of the hydrophobic coating to the DE surface can include the deposition of an intermediate layer that will chemically bond, or otherwise adhere, to the DE surface and conform to the DE topography and bond to the hydrophobic coating applied to the intermediate layer. Generally, it is preferred to practice the invention without an intermediate layer as the deposition of two conformal coatings increases the complexity and will generally increase the cost of the deposition process.

Figure 2:
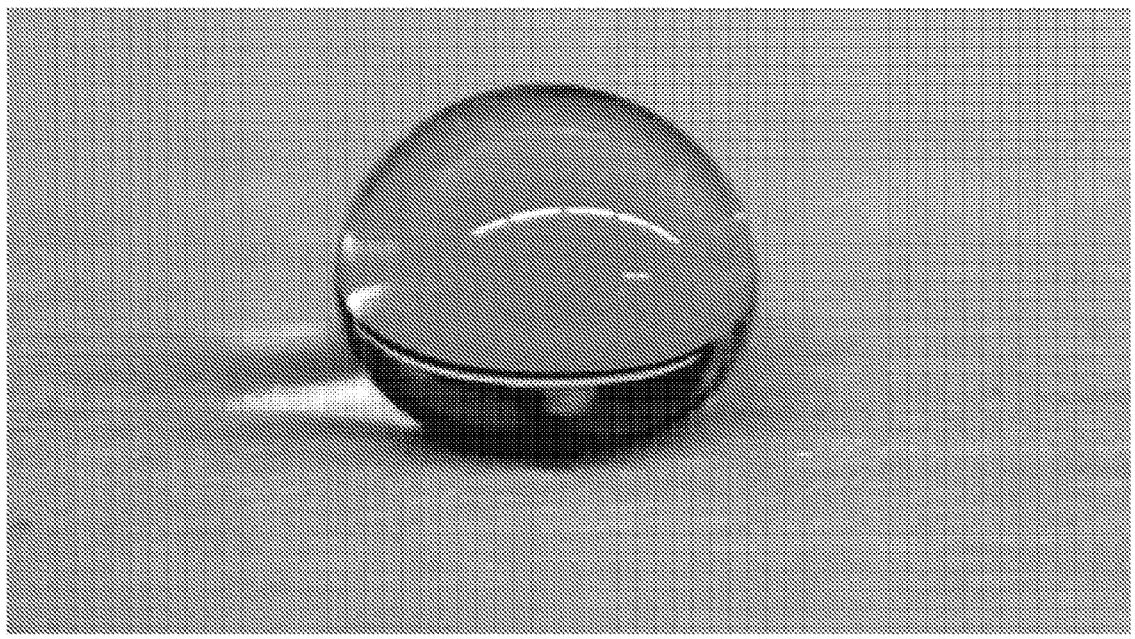
FIG. 2 shows a scanned image of a water drop on a superhydrophobic wood substrate of the invention. The wood surface was rendered superhydrophobic by the deposition of coating of superhydrophobic DE particles adhered to the surface with a polystyrene binder.

Once the superhydrophobic DE particles are formed they can be used to generate a variety of articles, such as where they are used as discrete particles in a powder as agglomerates or bound to each other or to an additional substrate. The particles can be dispersed onto a surface to render that surface superhydrophobic. The superhydrophobic powder can be directly applied to many surfaces including wood products, textiles, bricks, cinder blocks, paper products, or any porous material. The elaboration of the particles into a useful form can include the addition of a binder to the particles. Furthermore, the binder can be any compound that chemically or physically locks the particles to each other or a to substrate as long as the binder permits the maintenance or generation of the superhydrophobic surface. The use of a binder allows the application of the particles to nearly any surface including glasses, plastics, metals, and ceramics. Solvents and other processing aids can be included to the binder to facilitate binding and/or direct the binder to a desired portion of the particles and/or substrates. The use of such binders permits the formation of membranes, often with a porous substrate such as a woven fabric. For example, a hydrophobic DE powder of the invention can be suspended in acetone containing a small amount of a polystyrene or polyacrylate resin as a binder. The polyacrylate can be poly(methylacrylate), poly (ethylacrylate), poly(methylmethacrylate) or any polymerized ester or acrylic acid or substituted acrylic acid. A wide variety of polymers can be used as the binder. The suspension can be painted or sprayed onto a substrate. Upon evaporation of the solvent, the superhydrophobic powder is adhered to the substrate surface by the binder, imparting a superhydrophobic surface to the substrate. A wood surface rendered superhydrophobic is shown if FIG. 2 which shows a bead of water on the surface where the contact angle is in excess of 150 degrees. The wood was rendered superhydrophobic by deposition of a suspension of superhydrophobic DE particles, where the SAM was generated from the tridecafluoro-1,1,2, 2-tetrahydroctyltriclorosilane SAM precursor using a binder of polystyrene in acetone and permitting the acetone to evaporate.

The superhydrophobic DE of the present invention can be used to make a variety of articles. For example, articles can include superhydrophobic coatings for a variety of surfaces including watercraft hulls, construction, and liners for pipes and conduits and for the fabrication of membranes for gas separation.

While there has been shown and described what are at present considered the preferred embodiments of the invention, it will be obvious to those skilled in the art that various changes and modifications can be prepared therein without departing from the scope of the inventions defined by the appended claims.

We claim:

1. A coated particle comprising:
   a porous diatomaceous earth (DE) particle, having a highly-partitioned surface topography comprising ridges and peaks extending outwardly from the porous DE particle; and
   a hydrophobic layer, continuously conforming to and covalently bonded to the surface of said porous DE particle, such that the ridges and peaks of the DE particle are at least partially retained,
   wherein the coated particle is superhydrophobic
   wherein said DE particle comprises either uncalcined DE, or calcined DE which has been heat treated at less than 800° C.

2. The coated particle of claim 1, wherein said DE particles are uncalcined DE.

3. The coated particle of claim 1, wherein said hydrophobic layer comprises a self-assembled monolayer (SAM).

4. The coated particle of claim 3, wherein said hydrophobic layer comprises hexafluoropropene oxide oligomer moieties.

5. The coated particle of claim 1, wherein said hydrophobic layer comprises perfluorohydrocarbon moieties.

6. The coated particle of claim 5, wherein said perfluorohydrocarbon moieties comprise tridecafluorohexyl units.

7. A substrate, comprising:
   a plurality of coated particles according to claim 1,
   wherein the plurality of coated particles are dispersed onto a surface of the substrate to form a coated surface, and
   wherein the coated surface is superhydrophobic.

8. The substrate of claim 7, wherein said DE is uncalcined DE free of organic impurities.

9. The substrate of claim 7, wherein said substrate comprises wood, plastic, glass, ceramic or metal.

10. The substrate of claim 7, wherein said hydrophobic layer comprises a self-assembled monolayer (SAM).

11. The substrate of claim 10, wherein said SAM comprises perfluorohydrocarbon moieties.

12. The substrate of claim 11, wherein said perfluorohydrocarbon moieties comprise tridecafluorohexyl groups.

13. The substrate of claim 10, wherein said SAM comprises hexafluoropropene oxide oligomer moieties.

14. The substrate of claim 7, wherein the plurality of coated particles are adhered to the surface with a binder.

15. The substrate of claim 14, wherein the binder comprises a polymer.

16. A method for forming superhydrophobic surfaces, comprising the steps of:
providing a substrate having a surface;
providing a plurality of coated particles according to claim 1 forming a suspension of said coated particles in a binder solution; and contacting said suspension to said substrate surface.

17. The method of claim 16, wherein said step of contacting comprises dipping, painting, or spraying.

18. The method of claim 16, wherein said binder solution comprises a polymer dissolved in a volatile solvent.

19. The method of claim 18, wherein said binder solution comprises polystyrene or polyacrylate dissolved in acetone.

20. A powder comprising a plurality of coated particles according to claim 1.

21. A method of preparing the coated particle of claim 1 comprising the steps of,
providing a DE powder;
contacting a SAM precursor liquid to said surface of said DE powder wherein a hydrophobic SAM conforms and bonds to said surface; and
removing any excess of said SAM precursor.

22. The method of claim 21, wherein said DE powder is uncalcined DE.

23. The method of claim 21, further comprising the step of heat treating said DE powder to remove organic contaminates.

24. The method of claim 23, wherein said step of heat treating comprises heating to a temperature of about 400 to about 700° C.

25. The method of claim 23, wherein said step of heat treating comprises heating to a temperature of about 500 to about 600° C.

26. The method of claim 21, wherein said step of contacting is carried out at a temperature of about 0 to about 100° C.

27. The method of claim 21, wherein said hydrophobic SAM precursor comprises a molecule of the structure:

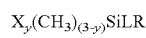

where y is 1 to 3;
X is Cl, Br, I, H, HO, R'HN, R'$_2$N, imidizolo, R'C(O)N(H), R'C(O)N(R"), R'O, F$_3$CC(O)N(H), F$_3$CC(O)N(CH$_3$), or F$_3$S(O)$_2$O, where R' is a straight or branched chain hydrocarbon of 1 to 4 carbons and R" is methyl or ethyl;
L, a linking group, is CH$_2$CH$_2$, CH$_2$CH$_2$CH$_2$, CH$_2$CH$_2$O, CH$_2$CH$_2$CH$_2$O, CH$_2$CH$_2$C(O), CH$_2$CH$_2$CH$_2$C(O), CH$_2$CH$_2$OCH$_2$, CH$_2$CH$_2$CH$_2$OCH$_2$; and
R is (CF$_2$)$_n$CF$_3$ or (CF(CF$_3$)OCF$_2$)$_n$CF$_2$CF$_3$, where n is 0 to 24.

28. The method of claim 27, wherein y is 3, X is Cl, L is CH$_2$CH$_2$, and R is (CF$_2$)$_n$CF$_3$.

29. The method of claim 28, wherein y is 3, X is Cl, L is CH$_2$CH$_2$, and R is (CF$_2$)$_5$CF$_3$.

30. The method of claim 21, wherein said liquid further comprises a solvent.

31. The method of claim 21, wherein said liquid further comprises a catalyst.

32. The method of claim 21, further comprising a step of adding water.

33. The method of claim 32, wherein said step of adding water comprises exposure to water vapor.

34. The method of claim 21, wherein said liquid further comprises a neutralizing agent.

35. The method of claim 34, wherein said neutralizing agent comprises a non-nucleophilic proton acceptor.

* * * * *